T. HOWELL.
Lifting-Jack.
No. 221,068. Patented Oct. 28, 1879.
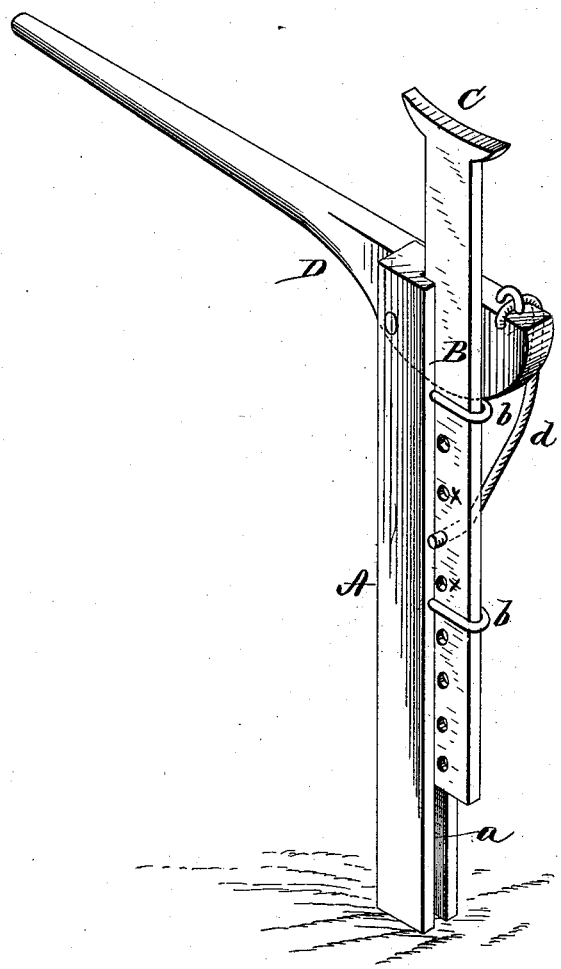
WITNESSES
INVENTOR
Thomas Howell
Alexander Mason
ATTORNEYS

UNITED STATES PATENT OFFICE.

THOMAS HOWELL, OF MORGANTOWN, WEST VIRGINIA.

IMPROVEMENT IN LIFTING-JACKS.

Specification forming part of Letters Patent No. 221,068, dated October 28, 1879; application filed September 17, 1879.

*To all whom it may concern:*

Be it known that I, THOMAS HOWELL, of Morgantown, in the county of Monongalia, and in the State of West Virginia, have invented certain new and useful Improvements in Lifting-Jacks; and I do hereby declare that the following is a full, clear, and exact description thereof, reference being had to the accompanying drawing, and to the letters of reference marked thereon, making a part of this specification.

The nature of my invention consists in the construction of a lifting-jack, as will be hereinafter more fully set forth.

The annexed drawing represents a perspective view of my invention.

A represents a standard of any suitable dimensions, having a longitudinal groove, $a$, in one edge, in which is placed a sliding bar, B. This bar is, at its upper end, provided with a head, C, and is held in the groove $a$ by means of staples or guides $b\ b$. The bar B is further provided with a series of holes, $x\ x$.

At or near the top, on one side of the standard A is pivoted a lever, D, which has a hook, $d$, hinged to its shorter end, as shown.

This lifting-jack is suitable for the lowest axle-tree by pushing down the sliding bar and raising the lever, and then inserting the hook $d$ in the top hole of the sliding bar. By thus pressing the lever D down to the ground it forces up the sliding bar about three inches, raising the wheel three inches from the ground. The downward motion of the lever passes the hook $d$ over the center and draws the lever to the ground, causing the same to form a second leg or standard to bear the weight, and also to prevent the wagon from running back.

The machine may be lengthened to suit any height of wagon by inserting the hook lower down in the sliding bar.

Having thus fully described my invention, what I claim as new, and desire to secure by Letters Patent, is—

The combination of the standard A, perforated sliding bar B, lever D, and hook $d$, all constructed and arranged as described, whereby the lever is caused to form a second leg or standard, substantially as and for the purposes herein set forth.

In testimony that I claim the foregoing I have hereunto set my hand this 3d day of September, 1879.

THOMAS HOWELL.

Witnesses:
  W. C. KELLY,
  F. S. LYON.